R. A. Parrish Jr,
Hose Nozzle,
Nº 44,743.
Patented Oct. 18, 1864.
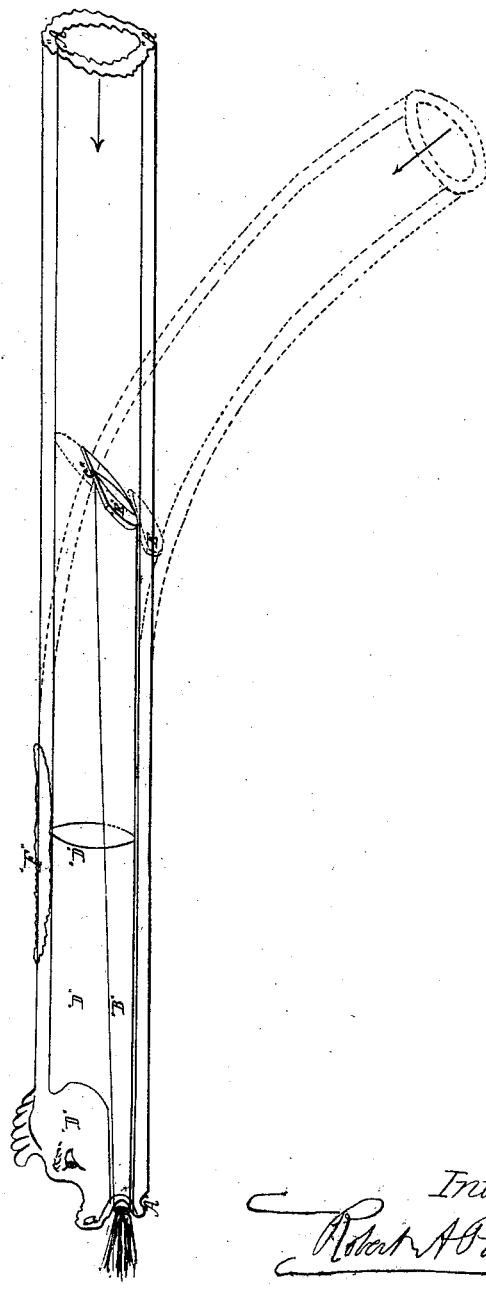
Witnesses:
William Harper
Jas McCarty
Inventor.
Robert A Parrish Jr

UNITED STATES PATENT OFFICE.

ROBERT A. PARRISH, JR., OF PHILADELPHIA, PENNSYLVANIA.

IMPROVEMENT IN VALVE ARRANGEMENTS FOR HOSE.

Specification forming part of Letters Patent No. 44,743, dated October 18, 1864; antedated December 12, 1863.

*To all whom it may concern:*

Be it known that I, ROBERT A. PARRISH, Jr., of the city and county of Philadelphia, and State of Pennsylvania, have invented a new and Improved Automatic Water-Lock, of which the following is a full and exact description, reference being had to the accompanying drawing, and to the letters of reference marked thereon.

The nature of my invention consists in introducing into the end of a perfectly-straightened piece of hose, (as shown at A in the drawing annexed,) a metallic pipe, marked B, about nine inches long, of the usual bore of garden branch pipes, and truncated at the inner extremity at an angle of forty-five degrees, the slope of said truncation inclining (when the pipe is *in situ*) downward and forward, (as indicated in the drawings at C,) at which point the diameter of the pipe should be half that of the interior diameter of the hose itself. The pipe, placed flat on the side of the hose, should be surrounded by water-tight packing from the nozzle to the distance of about half its length, (as shown in the drawing by the parts marked D,) whereby the inner half of the pipe is left free.

The truncated extremity of the pipe must be adjusted in precise contact with an elastic partition or valve of gutta-percha, or other substance, (in the drawing shown at E,) which, attached by its periphery to the hose transversely and sloping parallel with the truncation, closes up the orifice of the pipe, and also permanently closes one-half of the diameter of the hose. An external mark at F (as indicated in the drawing) shows where the hand of the operator grasps the hose.

While the hose is kept straight the pressure of the current of water jams the partition against the truncated end of the pipe and stops the flow of water. When, however, the hose is bent into the curve, which, from its elasticity and weight it usually assumes while in use, (as defined by the dotted lines in the drawings,) the partition or valve retreats below the extremity of the pipe and lets the water through.

When the hose is thrown on the ground, it straightens by its own elasticity, and the aperture in the branch pipe closes automatically.

What I claim as my invention, and desire to secure by Letters Patent, is—

1. The employment of the curvilinear flexure and elasticity of hose as a leverage for opening and closing the branch pipe by the agency of any partition or valve, in the manner above described.

2. In combination therewith, the truncation, adjustment, and packing of the branch pipe for about half its length with water-tight packing, as above set forth.

R. A. PARRISH, JR.

Witnesses:
WILLIAM HARPER, Jr.,
JAS. W. CARTY.